United States Patent [19]

Fukushima

[11] Patent Number: 4,796,740
[45] Date of Patent: Jan. 10, 1989

[54] FLYWHEEL ASSEMBLY

[75] Inventor: Hirotaka Fukushima, Hirakata, Japan

[73] Assignee: Kabushiki Kaisha Daikin Seisakusho, Osaka, Japan

[21] Appl. No.: 13,292

[22] Filed: Feb. 10, 1987

[30] Foreign Application Priority Data

Feb. 18, 1986 [JP] Japan .................. 61-34793
Feb. 18, 1986 [JP] Japan .................. 61-34794

[51] Int. Cl.$^4$ .................. F16F 15/12; F16F 15/30
[52] U.S. Cl. .................. 192/30 V; 74/574; 192/48.1
[58] Field of Search ........... 192/30 V, 48.1; 74/572, 74/574; 464/68, 64

[56] References Cited

U.S. PATENT DOCUMENTS 3,485,063  12/1969  Behlmer .................. 74/574
4,751,993   6/1988  Fukushima ............... 74/574

FOREIGN PATENT DOCUMENTS 1203823    1/1960  France .................. 192/48.1
14257      3/1983  Japan ................... 74/574
89850      5/1984  Japan ................... 74/572
61-201948  9/1986  Japan .
2153929    8/1985  United Kingdom ......... 192/48.1

Primary Examiner—Rodney H. Bonck
Assistant Examiner—David A. Testardi
Attorney, Agent, or Firm—Armstrong, Nikaido, Marmelstein & Kubovcik

[57] ABSTRACT

A flywheel assembly having an outer peripheral part of a first flywheel engaged with or disengaged from a clutch disc connected to a crank shaft by a relatively thin connecting plate disposed along an end face of a second flywheel opposite to the clutch disc, an outer periphery supporting mechanism supports a damper inertial part of the second flywheel relative to the first flywheel in a circumferentially rockable manner, a torsion damper mechanism resiliently connects the damper inertial part to a friction damping mechanism is installed in an inner peripheral part of the damper inertial part of the second flywheel, the torsion damper mechanisms are rotatably supported on the crankshaft by a bearing, a pressure surface on which a friction member of the friction damping mechanism presses is formed on a part of the torsion damper mechanism, the friction member being fixed to a substantially annular friction plate axially slidable on a spline hub of the clutch disc and a spring member urging the friction plate and the friction member toward the second flywheel is interposed between the friction plate and the spline hub.

5 Claims, 7 Drawing Sheets

FIG. 2
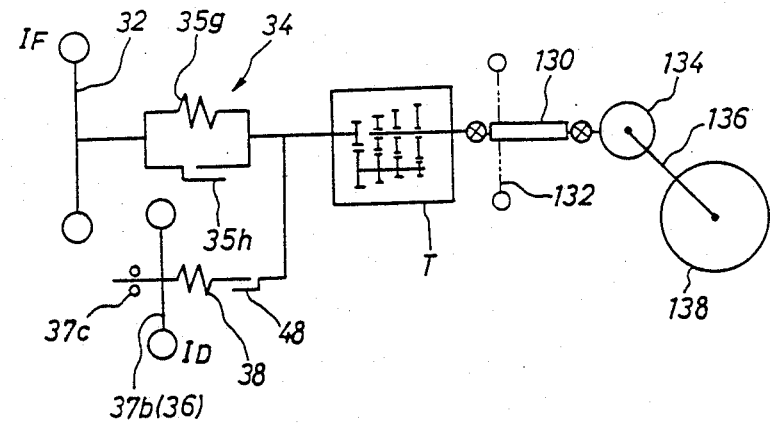
FIG. 7 PRIOR ART
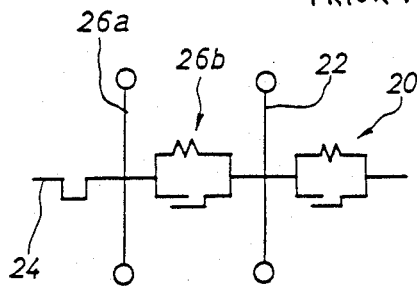
PRIOR ART FIG. 8
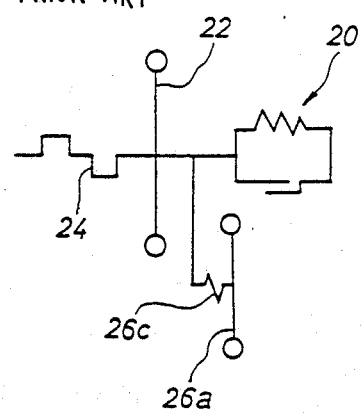

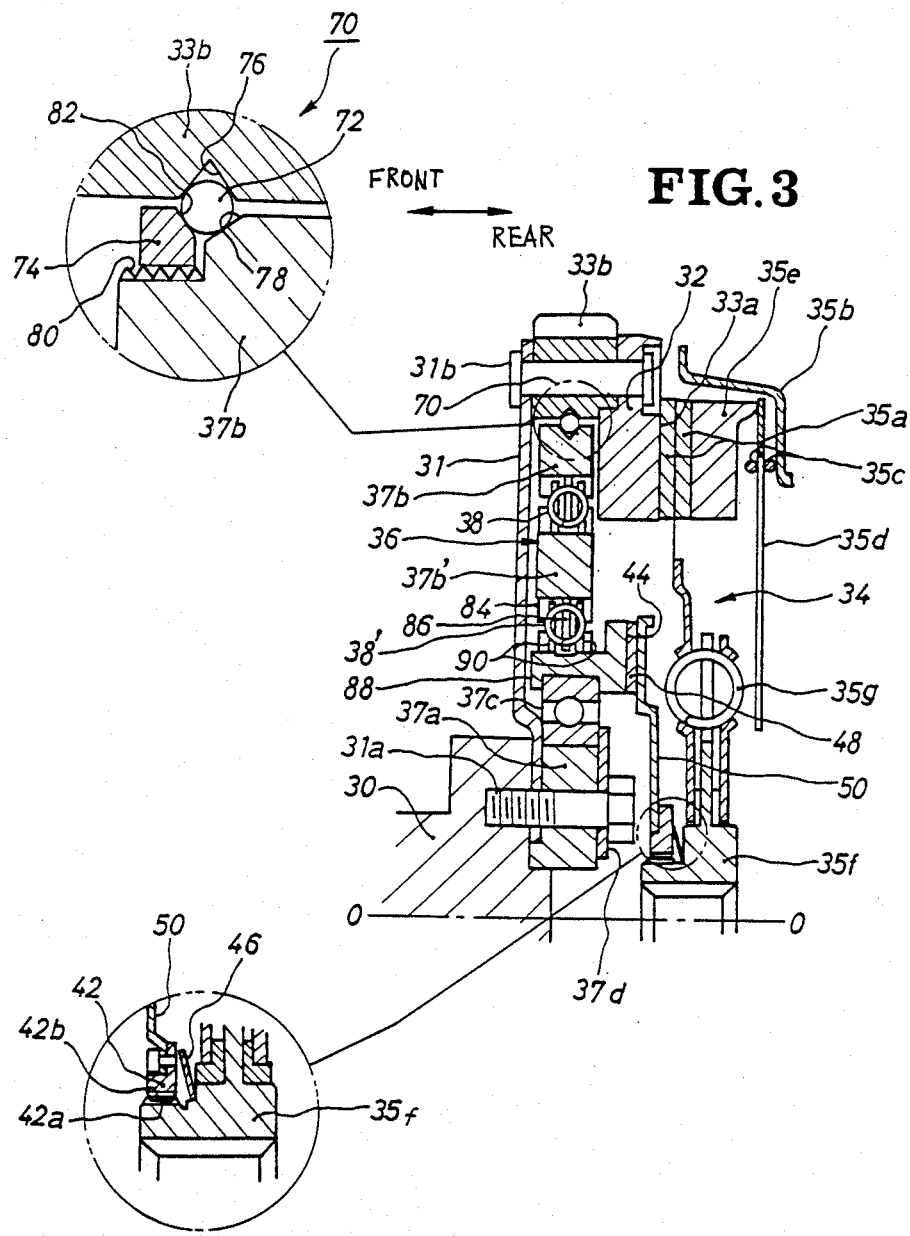

FLYWHEEL ASSEMBLY

BACKGROUND OF THE INVENTION 1. (Industrial useful field)

This invention relates to a flywheel assembly which absorbs, for example, a torsional vibration of a drive-transmission system in an automobile.

2. (Prior art and its problem)

In FIG. 5 which is a schematic structural diagram of a convention clutch disc, 10 is an engine input side and 12 is an output side from which a power is transmitted to a transmission, for example. A first-state torsion spring 14a, a second-stage torsion spring 14b and a third-stage torsion spring 14c are interposed between the input side 10 and the output side 12. Specified torsion angle plays 14d and 14e are provided to the second-stage torsion spring 14b and the third-stage torsion spring 14c, respectively. Further, a first-stage hysteresis torque generating mechanism 16a, a second-stage hysteresis torque generating mechanism 16b and a third-stage hysteresis torque generating mechanism 16c are also interposed between input side 10 and output side 12. Plays 16d and 16e are provided to the second-stage hysteresis torque generating mechanism 16b and the third-state hysteresis torque generating mechanism 16c, respectively.

In the above-mentioned conventional embodiment, a torsion characteristic changes from a first-stage torsion characteristic Kd1 and a first-stage hysteresis characteristic Th1 which are both generated by the first-stage torsion spring 14a together with the first-stage hysteresis torque generating mechanism 16a, to a third-stage torsion characteristic Kd3 and a third-stage hysteresis characteristic Th3 which are both generated by the third-stage torsion spring 14c together with the third-stage hysteresis torque generating mechanism 16c, with an increase in a torsion angle as shown by FIG. 6 which is a graph representing a relation between a torsion angle 0 and a transmitted torque Tr. However, this characteristic has the following disadvantage.

Namely, it is desired to set the first-stage torsion characteristic Kd1 and third-stage torsion characteristic Kd3 to small values as a countermeasure against noises such as gear chattering generated from a transmission in its neutral position and gear chatterings generated from the transmission and a differential gear in their driving position. On the contrary, however, it is necessary to set the first-stage torsion characteristic Kd1 and third-stage torsion characteristic Kd3 to large values as a countermeasure against low frequency vibrations.

Consequently, the torsion characteristic of FIG. 6 is set up separately according to a characteristic required to each vehicle. Further, since a level of requirement for noise and vibration control of clutches has becomes increasingly higher in recent years, sometimes a characteristic which can never be dealt with by the conventional structure is required. Such a case is where conflicting countermeasures against noise and low frequency vibration are required simultaneously as mentioned above.

Therefore, technologies have been developed where vibrations from engine are positively absorbed even by the flywheel.

There has been prior arts, for example, where an auxiliary flywheel 26a and a damper 26b are interposed in series between a conventional clutch disc 20 and flywheel 22 and a crank shaft 24 as shown in FIG. 7 and the axillary flywheel 26a is installed in parallel with the flywheel 22 through a torsion spring 26c as shown in FIG. 8.

With regard to this kind of flywheel assembly, the applicant of the present invention has developed and applied for a patent a flywheel assembly, as shown in FIG. 9, which includes a first flywheel 104 fastened to an engine crank shaft 100 and engaged and disengaged by a clutch disc 102, A second flywheel 106 is installed concentrically with the first flywheel and set to a specified mass, A damper mechanism 108 is resiliently coupling to both flywheels A friction damping mechanism 112, which transmits an output from the second flywheel 106 to a spline hub 110 of the clutch disc 102, damps its vibration only when the clutch disc 102 contacts the first flywheel 104. (Japanese Patent Application No. 60-44298, co-pending U.S. patent application Ser. No. 836,365, now U.S. Pat. No. 4,751,993, dated June 21, 1988, West German Patent Application No. 36 07 398.9, French Patent Application No. 8603211).

On the other hand, an inertial damper set to a specified mass, for example, may be equipped to a propeller shaft in order to damp a torsional vibration of a so-called drive-transmission system from an enginer output shaft to a driven wheel of an automobile. The applicant of the present invention made this invention while intending to damp the torsional vibration of the drive-transmission system by the use of the flywheel assembly in place of the inertial damper.

Further, an inertial damper set to a specified mass, for example, may be connected to a propeller shaft in order to damp a torsional vibration of a so-called drive-transmission system from an engine output shaft to a driven wheel of automobile. In this case, however, when plural peaks of different vibration frequency are included in a vibration characteristic of the drive-transmission system, such damper can not exert its full damping performance adapted to the vibration frequencies of respective peaks.

Therefore, the applicant of the present invention has made this invention while intending to damp the torsional vibration of the drive-transmission system, which includes the plural peaks of different vibration in its vibration characteristic, by the use of the flywheel assembly in place of the inertial damper.

(Object of the Invention)

An object of the invention is to provide a flywheel assembly which can damp a torsional vibration of a drive-transmission system by utilizing a part of a flywheel mass.

Another object of the invention is to provide a flywheel assembly which can damp a torsional vibration of a drive-transmission system including plural peaks of different vibration frequency in its vibration characteristic, by utilizing a part of a flywheel mass.

BRIEF DESCRIPTION OF THE INVENTION

A flywheel assembly including a first flywheel fastened to an engine crank shaft and engaged and disengaged by a clutch disc, a second flywheel supported concentrically with the first flywheel and set to a specified mass, and a friction damping mechanism which connects an inertial mass of the second flywheel to a spline hub of the clutch disc and damps a torsional vibration of the drive-transmission system only when the clutch disc contacts with the first flywheel; characterized by that an outer peripheral part of the first flywheel and the crank shaft are connected by a comparatively thin connecting plate disposed along an end face of the second flywheel opposite to the clutch disc, an outer periphery supporting mechanism is provided which supports a damper inertial part of the second flywheel for circumferential movement relatively to the first flywheel, a torsion damper mechanism resiliently connecting the damper inertial part to said friction damping mechanism is installed in an inner peripheral part of the damper inertial part, a bearing is installed which supports the torsion damper mechanism rotatably in relation to the crank shaft, a pressure surface on which a friction member of the friction damping mechanism presses is formed on a part of the torsion damper mechanism, the friction member is fixed to an approximately annular friction plate provided on the spline hub of the clutch disc in an axially sliding manner, and a spring member urging the friction plate and the friction member toward the second flywheel is interposed between the friction plate and the spline hub.

Function

The damper inertial part of the second flywheel is connected through the torsion damper mechanism to the drive-transmission system by the friction damping mechanism and damps the torsional vibration of the drive-transmission system only when the clutch disc is pressed on the first flywheel.

BRIEF DESCRIPTION OF THE DRAWINGS

The instant invention will be better understood from the following description of preferred embodiments of the invention taken with the appended drawings, in which

FIG. 2 is a schematic structural skeleton diagram of the structure of FIG. 1;

FIG. 3 is a vertical sectional partial view of a clutch according to a second embodiment of the invention;

FIG. 7 is a structural skeleton diagram, similar to FIG. 5, showing another prior art arrangement;

FIG. 8 is a further structural skeleton diagram, similar to FIGS. 5 and 7 and showing a further prior art arrangement.

A clutch according a first embodiment of the invention will be described hereunder with reference to FIG. 1.

Figure 1:
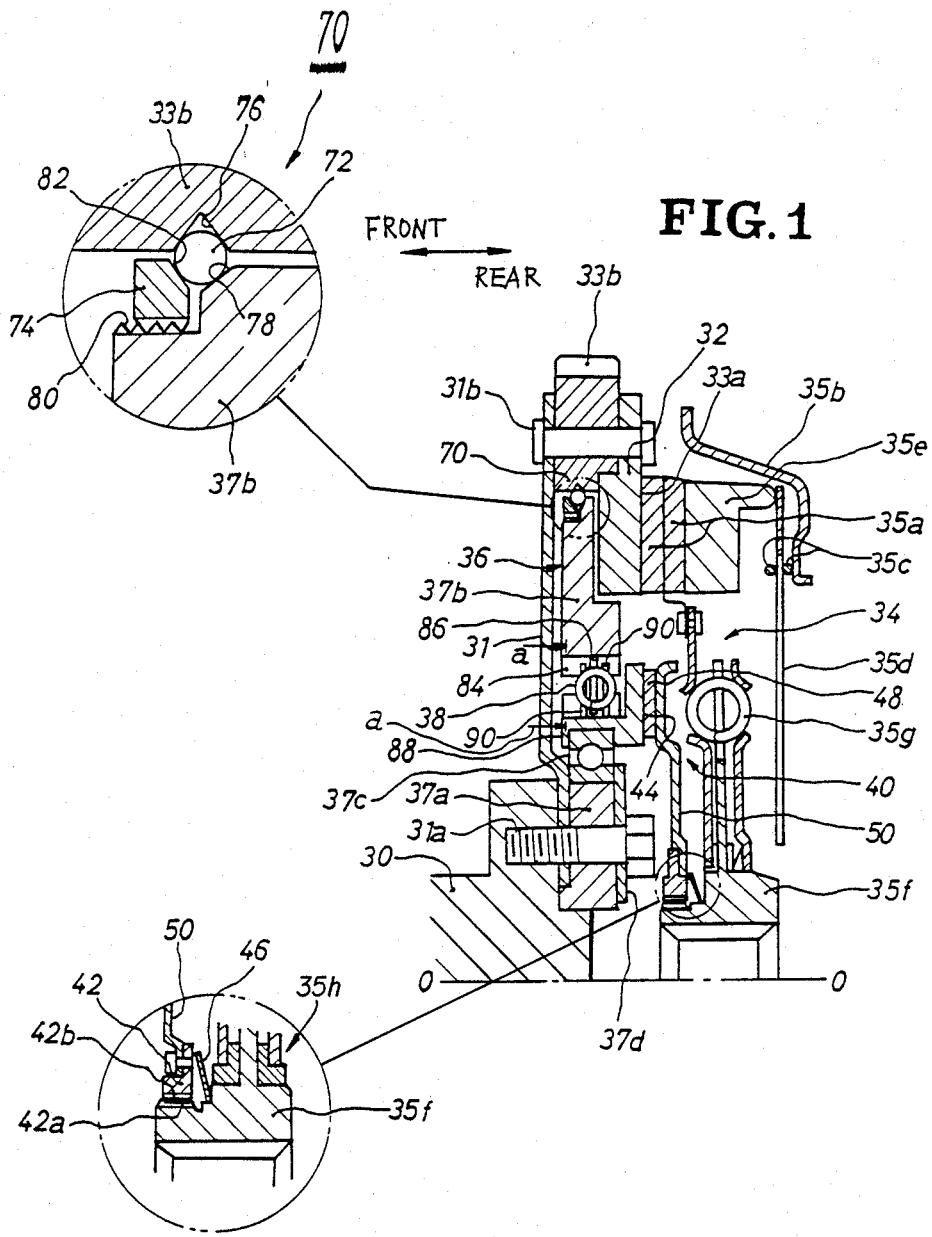
FIG. 1 is a vertical sectional partial view of a clutch according to a first embodiment of the invention.

In FIG. 1, 30 is an engine crank shaft. A first flywheel 32 is fixed to a rear end of the crank shaft 30 by means of a relatively thin connecting plate 31 which will be described later in details. A facing 35a of the clutch disc 34 is adapted to contact with an annular surface 33a of the first flywheel 32. A ring gear 33b is formed on a radially outer peripheral part of the first flywheel 32, and a power of well-known starter motor (not shown) is inputted from this ring gear 33b. Further, the connecting plate 31 and the first flywheel 32 are fastened together by rivets 31b disposed at eight places, for example, in a circumferential direction.

A clutch cover 35b is fastened to a rear end face of the first flywheel 32, and a pressure plate 35e is held to the clutch cover 35b through a wire ring 35c and a diaphragm spring 35d.

The first flywheel 32 is formed into an approximately disc-like shape, and a second flywheel 36 is installed at a front of the first flywheel 32 rotatably and concentrically with the first flywheel 32.

The second flywheel 36 is formed into an approximately annular shape and is mounted on flange 37a at its inner peripheral part and has a damper inertial part 37b at its outer peripheral part. The damper inertial part 37b is set to a specified mass adapted to an inertial mass of the drive-transmission system such as a transmission (not shown) etc. connected to a rear stage of the clutch.

An outer periphery supporting mechanism 70 is interposed between an outer peripheral part of the damper inertial part 37b and an inner peripheral part of the ring gear 33b fixed to the flywheel 32. The outer periphery supporting mechanism 70 is composed of a steel ball 72, a nut 74 etc. An annular groove 76 having an approximately triangular section is formed over the entire circumference of the ring gear 33b. A tapered surface 78 is formed over the entire circumference of an outer periphery of the damper inertial part 37b in such a manner as facing on the annular groove 76, and a large number of steel balls 72 are rotatably housed between the tapered surface 78 and the annular groove 76 so as to be pressed on the annular groove 76 and the tapered surface 78. Further, a threaded part 80 is formed at an outer peripheral front end of the damper inertial part 37b, and said approximately annular nut 74 screws in the threaded part 80. A tapered surface 82 facing on the annular groove 76 is formed also on the nut 24 which presses the tapered surface 82 on the steel ball 72 to hold the steel ball 72.

A torsion spring 38 (torsion damper mechanism) is compressively installed in an inner peripheral part of the damper inertial part 37b, as described later in details, to resiliently connect the damper inertial part 37b to said clutch disc 34 through the friction damping mechanism 40.

Figure 1A:
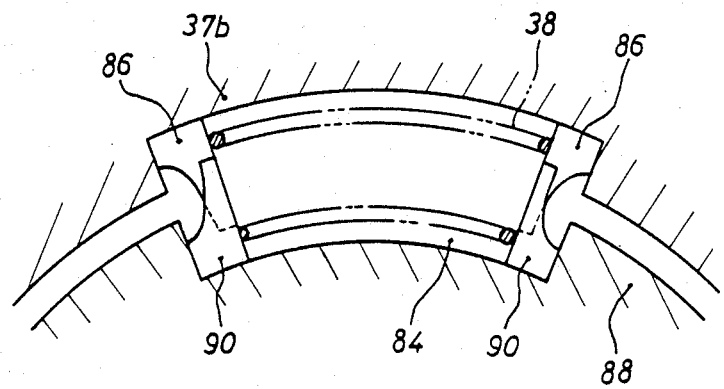
FIG. 1a is a sectional view taken at line a—a, FIG. 1.

The torsion spring 38 is installed in a recessed part 84 formed on an inner peripheral part of the damper inertial part 37b, and the recessed part 84 is formed, for example, at six places with equal distances left therebetween in a circumferential direction of the damper inertial part 37b (FIG. 1a). A spring holder 86 integral with the damper inertial part 37b and two spring holders 90 integral with a damper hub 88 fitting onto the ball bearing 37c extend in the recessed part 84. Torsion spring 38 is compressively installed between the spring holder 86 and the spring holders 90 (FIG. 1a). The damper hub 88, FIG. 1, is formed into an approximately annular shape consecutive over the entire circumference, and a pressure surface 44 on which a friction member of the friction damping mechanism 40 presses is formed at a rear end face of the damper hub 88.

A ball bearing 37c is interposed between mounting flange 37a and the damper hub 88. Damper inertial part 37b is supported by the ball bearing 37c rotatably in relation to mounting flange 37a. The flange 37a is fastened by a bold 31a to the crank shaft 30 together with an inner peripheral part of the connecting plate 31 disposed along a front end of the second flywheel 36. Bearing 37c is held by bearing holder 37d, FIG. 1.

As shown in FIG. 1, friction damping 40 is interposed between damper hub 88 part 37b and a spline hub 35f of the clutch disc 34, friction damping mechanism 40 damps torsional vibration generated from drive-transmission system in a clutch engaged state where the facing 35a is pressed on the pressure surface 33a of the first flywheel 32.

The friction damping mechanism 40 includes coned disc spring 46, a friction facing 48 and friction plate 50. The friction plate 50 is made of an approximately annular thin plate. The inner peripheral part of the friction plate 50 is fastened to a hub 42. A spline internal tooth 42a of the hub 42 meshes with a spline external tooth 42b of a spline hub 35f in an axially sliding manner. The coned disc spring 46 is interposed between the hub 42 and the spline hub 35f, and a spring force of the coned disc spring 46 urges friction plate 50 and the facing 48 toward the front or crank shaft end of the flywheel assembly.

The facing 48 is bonded to an outer peripheral front face of the friction plate 50, and contacts pressure surface 44 of damper hub 88. The pressure surface 44 is formed into an annular shape in a circumferential direction of the second flywheel 36.

As shown schematically in the shelton diagram in FIG. 2, the clutch disc 34 and the damper inertial part 37b having an inertial mass: $I_D$ of the second flywheel 36 are disposed in parallel at a rear-stage of the first flywheel 32 having an inertial mass: $I_F$. The damper inertial part 37b is supported by the bearing and the outer periphery supporting mechanism 70 (FIG. 1) through the facing 48 separately from the first flywheel 32.

Torsion spring 35g is connected to clutch disc 34 in parallel with a hysteresis generating mechanism 35h. The facing 48 for generating a hysteresis torque is in series with the second flywheel 36. The drive-transmission system including transmission T, a propeller shaft 130, a differential gear 134, an axle 136, tire 138. is connected to a rear stage of the clutch disc 34.

The operation is described hereunder. In the clutch engaging state, where the facing 35a is pressed on the annular surface 33a of the first flywheel 32 by the pressure plate 35e, the spring force of the diaphragm spring 35d urges the clutch disc 34 to slide on a spline shaft of a transmission (not shown) toward the first flywheel 32. The friction plate 50 presses on the facing 48. In this instance, the coned disc spring 46 deforms itself due to a pressing force from the friction plate 50. The friction plate 50 and the facing 48 are pressed together by a constant pressure, so that a friction force generated between the facing 48 and the friction plate 50 is always kept constant.

In the above clutch engaging state, the engine power inputted in the first flywheel 32 is transmitted through the clutch disc 34 to the transmission. At the same time the inertial mass $I_D$ of the damper inertial part 37b of the second flywheel 36 is connected through torsion spring 38, the facing 48 and the friction plate 50 to the drive-transmission system such as the transmission T.

Accordingly, the torsional vibration generated in the drive-transmission system is damped by the damper inertial part 37b of the second flywheel and the spring force of the torsion spring 38, so that it is not required to install an inertial damper 132 in a propeller shaft 130 for example, at the rear-stage of the transmission T. Therefore, it becomes unnecessary to provide an excessive mass of the damper 132 in the drive-transmission system from the transmission T to the tire 138. The inertial mass of the overall drive-transmission system can be decreased.

Further, because the damper inertial part 37b is disposed at a front-stage of the transmission T, a torsional vibration damping effect of the damper inertial part 37b is not affected by a reduction ratio of the transmission T. The inertial part exerts its performance always stably under a constant condition.

Since the connecting plate 31 has a comparatively thin wall, vibration of the first flywheel 32, generated around an axis perpendicular to shaft O when the clutch disc 34 is engaged with or disengaged from the first flywheel 32, is absorbed by the elasticity of the connecting plate 31.

At the time of starting the engine, the power from the starter motor (not shown) is inputted in the ring gear 33b of the first flywheel 32, and is transmitted from the ring gear 33b through the connecting plate 31 directly to the crank shaft 30.

Moreover, when the entire clutch disc 34 is replaced due to worn-out of the facings 35a and 48 after a long period of use, the friction plate 50 and the facing 48 are also replaced together with the clutch disc 34. All parts of the friction damping mechanism 40 to be placed are installed at the clutch disc 34 side so that the first flywheel 32 side and the second flywheel 36 side are not required to be disassembled.

As described above, the first embodiment of the flywheel assembly including the first flywheel 32 fastened to the engine crank shaft 30 and engaged and disengaged by the clutch disc 34, the second flywheel 36 supported concentrically with the first flywheel 32 and set to the specified mass, and the friction damping mechanism 40 which connects the inertial mass $I_D$ of the damper inertial part 37b of the second flywheel 36 to the spline hub 35f of the clutch disc 34 and dampers the torsional vibration of the drive-transmission system only when the clutch disc 34 contacts with the first flywheel 32 is characterized in that the outer peripheral part of the first flywheel 32 and the crank shaft 30 are connected together by a comparatively thin connecting plate 31 disposed along the end face of the second flywheel 36 opposite to the clutch disc, the outer periphery supporting mechanism 70 is provided which supports the damper inertial part 37b of the second flywheel 36 to the first flywheel 32 in the circumferentially rockable manner, the torsion spring 38, or torsion damper mechanism resiliently connecting the damper inertial part 37b to the friction damping mechanism 40 is installed in the inner peripheral part of the damper inertial part 37b, the bearing 37c is installed which supports the torsion spring 38 rotatably in relation to the crank shaft 30, the pressure surface 44 on which the facing 48 of the friction damping mechanism 40 presses is formed on the damper hub 88, the facing 48 is fixed to the approximately annular friction plate 50 provided on the spline hub 35f of the clutch disc 34 in the axially sliding manner, and the coned disc spring member 46 urging the friction plate 50 and the facing 48 toward the second flywheel is interposed between the friction plate 50 and the spline hub 35f. Therefore, the following advantages become obtainable.

The torsional vibration generated in the drive-transmission system can be damped in the damper inertial part 37b of the second flywheel 36 resiliently supported by the spring sorce of the torsion spring 38, so that it is not required to install the inertial damper 132 in the propeller shaft 130 for example, at the rear-stage of the transmission T, as with the conventional flywheel. For this reason, it becomes unnecessary to provide the excessive mass of the damper 132 in the drive-transmission system so that the inertial mass of the overall drive-transmission system can be decreased.

Further, since the damper inertial part 37b is disposed at the front-stage of the transmission T, the torsional vibration damping effect of the damper inertial part 37b is not affected by the reduction ratio of the transmission and the inertial part 37b always exerts torsional vibration damping effect stably under a constant condition.

Friction as stated in this specification, means all friction phenomena such as dry friction, viscous friction, and the like.

The second embodiment of the invention will be described hereunder with reference to FIG. 3.

The second embodiment of the invention includes a flywheel assembly including a first flywheel fastened to an engine crank shaft and engaged and disengaged by a clutch disc, a second flywheel supported concentrically with the first flywheel and set to a specified mass, and a friction damping mechanism which connects an inertial mass of the second flywheel to a spline hub of the clutch disc and damps a torsional vibration of the drive-transmission system only when the clutch disc contacts with the first flywheel is characterized in that an outer peripheral part of the first flywheel and the crank shaft are connected by a comparatively thin connecting plate disposed along an end face of the second flywheel opposite to the clutch disc, a bearing is installed which supports a damper inertial part of the second flywheel for limited circumferential movement relative circumferentially rockably to an inner peripheral flange of the second flywheel, a pressure surface on which a friction member of the friction damping mechanism presses is formed on the damper hub, the friction member is fixed to an approximately annular friction plate provided on the spline hub of the clutch disc in an axially sliding manner, and a spring member urging the friction place and the friction member toward the second flywheel is interposed between the friction plate and the spline hub.

The function of the second embodiment of the invention will be described hereunder.

The damper inertial part of the second flywheel is connected through the multi-stage damper mechanism to the drive-transmission system by the friction damping mechanism and damps the torsional vibration of the drive-transmission system only when the clutch disc is pressed on the first flywheel.

The multi-stage damper mechanism damps a torsional vibration of the drive-transmission system a vibration characteristic of which includes plural peaks of different vibration frequency.

In FIG. 3, 30 is an engine crank shaft. A first flywheel 32 is fixed to a rear end of the crank shaft 30 by means of a comparatively thin connecting plate 31 which will be described later in details. A facing 35a of the clutch disc 34 is adapted to contact with an annular surface 33a of the first flywheel 32. A ring gear 33b is formed on a radially outer peripheral part of the first flywheel 32, and a power of well-known starter motor (not shown) is inputted from ring gear 33b. Further, the connecting plate 31 and the first flywheel 32 are fastened together by rivets 31b disposed at eight places, for example, in a circumferential direction.

A clutch cover 35b is fastened to a rear end face of the first flywheel 32, and a pressure plate 35e is held to the clutch cover 35b through a wire ring 35c and a diaphragm spring 35d.

The first flywheel 32 is formed into an approximately disc-like shape, and a second flywheel 36 is installed at a front of the first flywheel 32 rotatably concentrically with the first flywheel 32.

The second flywheel 36 is formed into an approximately annular shape having a mounting 37a in its inner peripheral part and divided-into-two damper inertial parts 37b and 37b' in its outer peripheral part. Damper inertial parts 37b and 37b', set to an inertial mass of the drive-transmission system (not shown) are connected to a rear-stage of clutch and have a specified mass adapted to a vibration characteristic which will be described later in details, respectively.

An outer periphery supporting mechanism 70 is interposed between an outer peripheral part of the outer peripheral side damper inertial part 37b and an inner peripheral part of the ring gear 33b fixed to the flywheel 32. The outer periphery supporting mechanism 70 includes a steel ball 72 and a nut 74. An annular groove 76 having an approximately triangular section is formed over the entire circumference of the ring gear 33b. A tapered surface 78 is formed over the entire circumference of an outer periphery of the damper inertial part 37b in such a manner as facing on the annular groove 76. A large number of steel balls 72 are rotatably housed between the tapered surface 78 and the annular groove 76 so as to be pressed on the annular groove 76 and the tapered surface 78. Further, a threaded part 80 is formed at an outer peripheral front end of the damper inertial part 37b. An approximately annular nut 74 is screws in the threaded part 80. A tapered surface 82 facing on the annualr groove 76 is formed on the nut 24 which presses the tapered surface 82 on the steel ball 72 to hold the steel ball 72.

Torsion springs 38 and 38' forming a multi-stage torsion damper mechanism, are compressively installed between damper inertial parts 37b and 37b' and in an inner peripheral part of the damper inertial part 37b respectively, as described later in details, to resiliently connect the damper inertial part 37b to the clutch disc 34 through the friction damping mechanism 40.

The inner peripheral side torsion spring 38', for example, is installed in a recessed part 84 formed on an inner peripheral part of the damper inertial part 37b'. The recessed part 84 is formed, for example, at six places with equal distances left therebetween in a circumferential direction of the damper inertial part 37b'. A spring holder 86 integral with the damper inertial part 37b' and two spring holders 90 integral with a damper hub 88 fitting onto the ball bearing 37c extend in the recessed part 84. The torsion spring 38' is compressively installed between the spring holder 86 and the spring holders 90. The damper hub 88 is formed into an approximately annular shape consecutive over the entire circumference. Pressure surface 44 on which the friction member of the friction damping mechanism 40 presses is formed at a rear end face of the damper hub 88. The plane structure of this part is the same as FIG. 1a, and the outer peripheral side torsion spring 38 is also compressively installed therein.

The friction damping mechanism 40 is composed of a coned disc spring member 46, a friction facing 48 and a friction plate 50. The friction plate 50 is made of an approximately annular thin plate, and an inner peripheral part of the friction plate 50 is fastened to a hub 42. A spline internal tooth 42a of the hub 42 meshes with a spline external tooth 42b of a spline hub 35f in an axially sliding manner. The coned disc spring 46 is interposed between the hub 42 and the spline hub 35f. The spring force of the coned disc spring 46 urges the friction plate 50 and the facing 48 toward a front side.

The facing 48 is bonded to an outer peripheral front face of the friction plate 50, and slidingly contacts pressure surface 44 of the damper hub 88. The pressure surface 44 is formed into an annular shape circumferential of the second flywheel 32.

Figure 4:
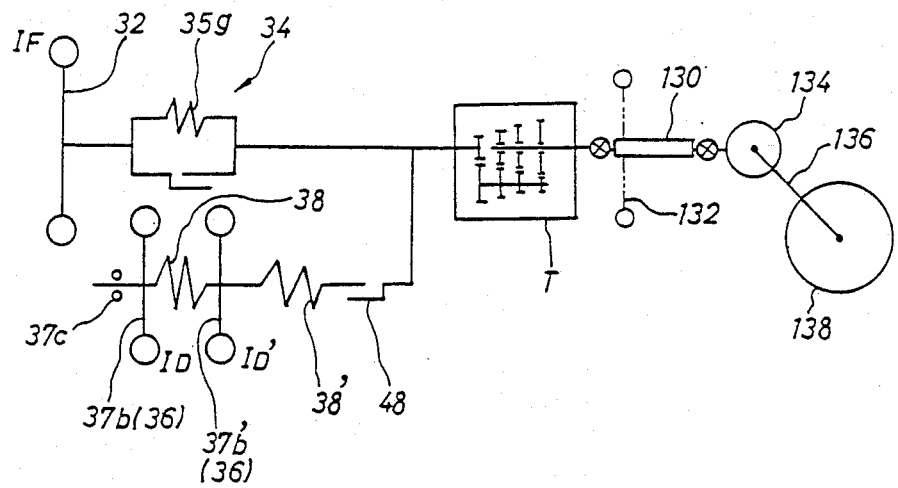
FIG. 4 is a schematic structural skeleton diagram of the structure of FIG. 3.

As shown schematically in the skeleton diagram FIG. 4, the clutch disc 34 and the damper inertial parts 37b and 37b' having inertial masses $I_D$ and $I_D$,) of the second flywheel 36 are disposed in parallel at the rear-stage of the first flywheel 32 having an inertial mass $I_F$. These damper inertial parts 37b and 37b' are supported by the bearing 37c and the outer periphery supporting mechanism 70 (FIG. 3) through the facing 48 separately from the first flywheel 32.

Further, a torsion spring 35g is connected in parallel with a hysteresis generating mechanism 35h to the clutch disc 34. The facing 48 for generating a hysteresis torque is installed in series with the second flywheel 36. The drive-transmission system includes transmission T, a propeller shaft 130, a differential gear 134, an axle 136, and tire 138. is and connected to a rear-stage of the clutch disc 34. The operation of the embodiment of FIG. 3 will be described hereunder. In the clutch engaging state where the facing 35a is pressed on the annular surface 33a of the first flywheel 32 by the pressure plate 35e, the spring force of the diaphragm spring 35d urges the clutch disc 34 to slide on a spline shaft of a transmission (not shown) toward the first flywheel 32, and the friction plate 50 presses on the facing 48. In this instance, the coned disc spring 46 deforms itself due to a pressing force from the friction plate 50 and the friction plate 50 and the facing 48 are pressed together by a constant pressure, so that a friction force generated between the facing 48 and the friction plate 50 is kept constant.

In the above clutch engaging state, the engine power inputted in the first flywheel 32 is transmitted through the clutch disc 34 to the transmission and, at the same time, the inertial masses $I_D$ and $I_D$, of the damper inertial parts 37b and 37b' of the second flywheel 36 are connected through torsion springs 38 and 38', the facing 48 and the friction plate 50 to the drive-transmission system such as the transmission T.

Figure 4A:
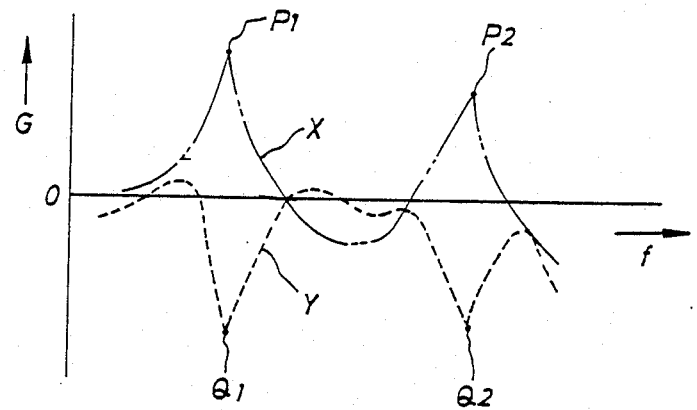
FIG. 4a is a graph showing a change in a magnitude of vibration in relation to a number of rotations.
Figure 5:
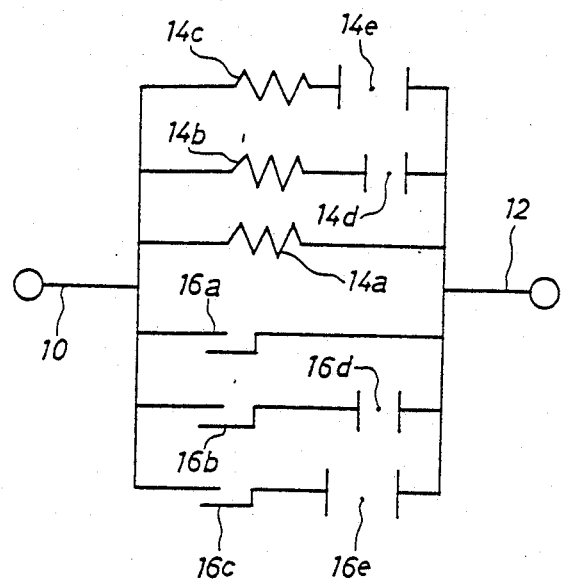
FIG. 5 is a structural skeleton diagram of a prior art arrangement.
Figure 6:
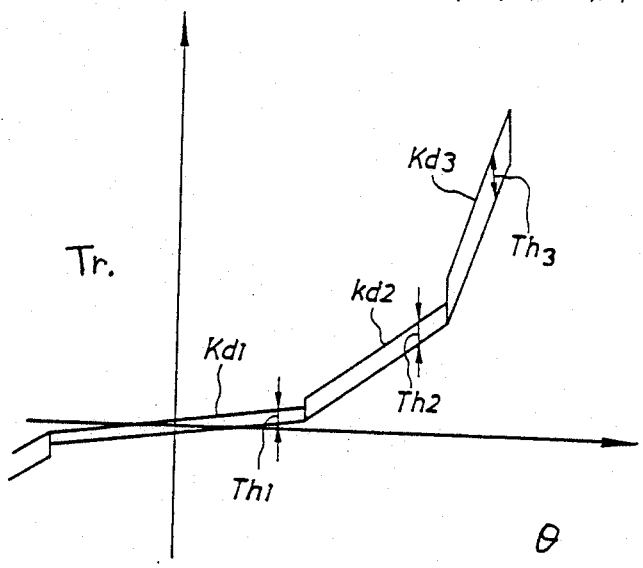
FIG. 6 is a graph showing the torsional characteristics of the prior are embodiment of FIG. 5.
Figure 9:
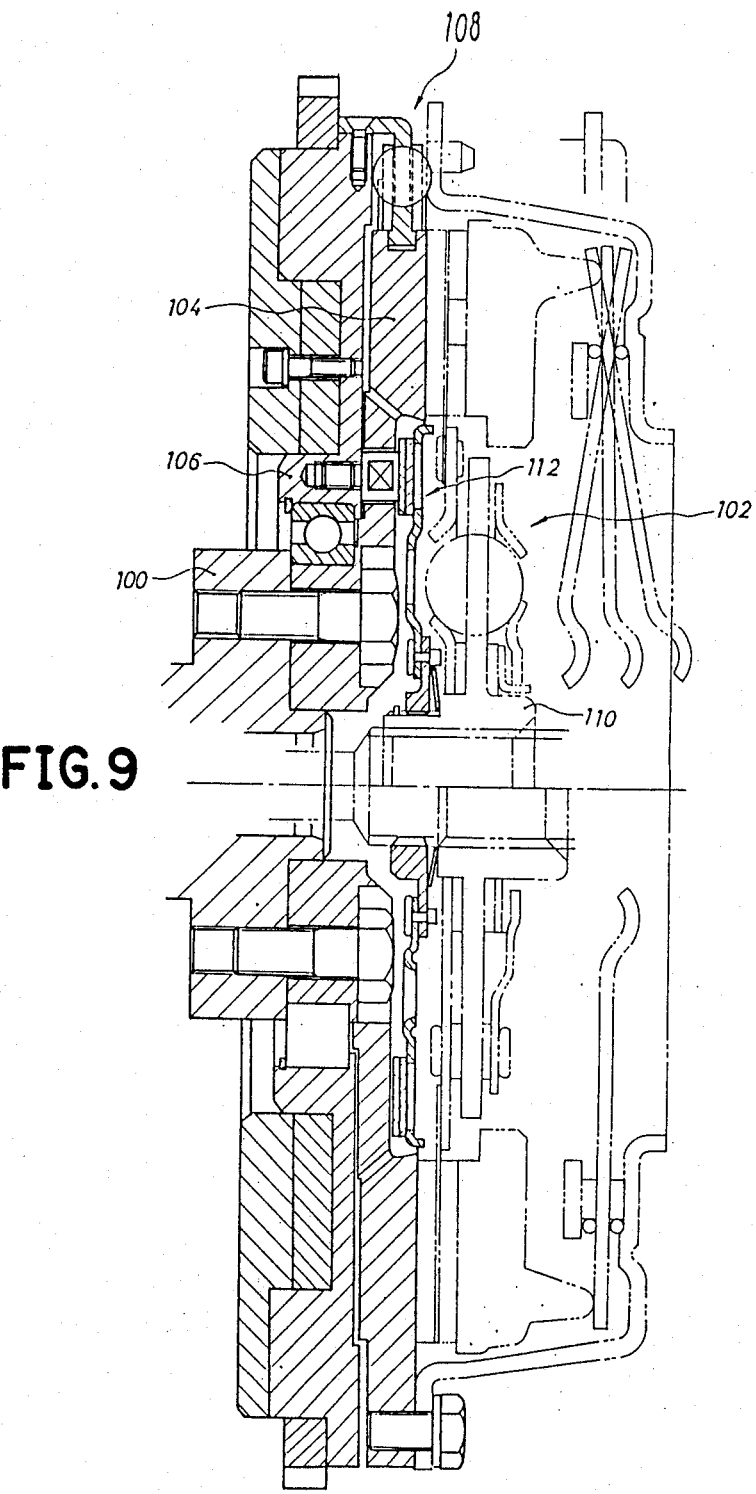
FIG. 9 is a vertical sectional view of the flywheel and clutch arrangement of my co-pending application Ser. No. 836,365, now U.S. Pat. No. 4,751,693, dated June 21, 1988.

Accordingly, as shown in FIG. 4a showing change in a magnitude of vibration G in relation to a number of rotation f, even when peaks P1 and P2 of different number of rotation arise in a torsion vibration characteristic X of the above-mentioned drive-transmission system, the magnitude G of vibration characteristic Y of the drive-transmission system is synthesized from the characteristic X. The damper characteristic is damped to practically a negligible value, through means that resonance points Q1 and Q2 generated by the damper inertial parts 37b and 37b' of the second flywheel together with spring forces of the torsion springs 38 and 38' (spring coefficients being adjusted properly) are synchronized with the peaks P1 and P2 of the characteristic X. Therefore, it is not required to install an inertial damper 132 in a propeller shaft 130, for example, at the rear-stage of the transmission T (FIG. 2) as with the conventional case. For this reason, it becomes unnecessary to provide an excessive mass of the damper 132 in the drive-transmission system from the transmission T to the tire 138, so that an inertial mass of the overall drive-transmission system can be decreased.

Further, because the damper inertial parts 37b and 37b' are disposed at a front-stage of the transmission T, a torsional vibration damping effect of the damper inertial part 37b is not affected by a reduction ratio of the transmission T and the inertial part works always stably under a constant condition.

At the time of starting the engine, the power from the starter motor (not shown) is inputted in the ring gear 33b of the first flywheel 32 and is further transmitted from the ring gear 33b through the connecting plate 31 directly to the crank shaft 30.

Moreover, when the entire clutch disc 34 is replaced due to worn-out of the facings 35a and 48 after a long period of use, also the friction plate 50 and the facing 48 are replaced along with the clutch disc 34. Therefore, all consuming parts of the friction damping mechanism 40 are installed at the clutch disc 34 side so that the first flywheel 32 side and the second flywheel 36 side are not required to be disassembled.

As described above, the second embodiment of the flywheel assembly of the invention includes the first flywheel 32 fastened to the engine crank shaft 30 and engaged and disengaged by the clutch disc 34, a second flywheel 36 supported concentrically with the first flywheel 32 and set to the specified mass, and friction damping mechanism 40 which connects the inertial mass $I_D$ of the damper inertial part 37b of the second flywheel 36 to the spline hub 35f of the clutch disc 34 and damps the torsional vibration of the drive-transmission system only when the clutch disc 34 contacts with the first flywheel 32 and is characterized in that the outer peripheral part of said first flywheel 32 and the crank shaft 30 are connected together by the comparatively thin connecting plate 31 disposed along the end face of the second flywheel 36 opposite to the clutch disc, the outer periphery supporting mechanism 70 is provided which supports the damper inertial part 37b of the second flywheel 36 to the first flywheel 32 in the circumferentially rockable manner, the divided-into-two damper inertial parts 37b and 37b' are provided, the torsion springs 38 and 38' making up a multi-stage torsion damper mechanism, are provided which connect respective damper inertial parts 37b and 37b' to said friction damping mechanism 40, the bearing 37c is installed which supports the torsion spring 38 rotatably in relation to the crank shaft 30, the pressure surface 44 on which the facing 48 of the friction damping mechanism 40 presses is formed on the damper hub 88, the facing 48 being fixed to the approximately annular friction plate 50 provided on the spline hub 35f of the clutch disc 34 in the axially sliding manner, and the coned disc spring 46 member urging the friction plate 50 and the facing 48 toward the second flywheel is interposed between the friction plate 50 and the spline hub 35f. Therefore, the following advantages become obtainable.

As shown in FIG. 4a showing the change in magnitude of vibration G in relation to the number of rotation f, even when the peaks P1 and P2 of different number of rotation arise in the torsion vibration characteristic X of the above-mentioned drive-transmission system, resonance points Q1 and Q2 generated by the damper inertial parts 37b and 37b' of the second flywheel together with the spring forces of the torsion springs 38 and 38' (spring coefficients being adjusted properly) can be synchronized with the peaks P1 and P2 of the characteristic X.

Accordingly, the magnitude G of vibration characteristic Y of the drive-transmission system, synthesized from the characteristic X and the damper characteristic, can be damped to such a value as small as practically negligible so that it is not required to install the inertial damper 132 in the propeller shaft 130, for example, at the rear-stage of the transmission T as with the conventional case. For this reason, it becomes unnecessary to provide the excessive mass of the damper 132 in the drive-transmission system so that the inertial mass of the overall drive-transmission system can be decreased.

Further, because the damper inertial parts 37b and 37b' are disposed at the front-stage of the transmission T, the torsional vibration damping effect of the damper inertial part 37b is not affected by the reduction ratio of the transmission T and the inertial part works always stably under a constant condition.

The damper inertial parts 37b and 37b' are not necessarily be divided into two pieces as described in the second embodiment, but may be divided into multipieces such as three or more pieces, four pieces etc.

What is claimed is:

1. A flywheel assembly including a first flywheel fastened to an engine crankshaft and engaged and disengaged by a clutch disc, a second flywheel concentrically supported with respect to the first flywheel and rotatably connectable to a spline hub of the clutch disc via a friction damping mechanism, wherein the second flywheel comprises a damper inertial part and a damper hub resiliently coupled together by a torsion damper mechanism, and wherein the friction damping mechanism comprises a friction plate rotatably connected to the spline hub of the clutch disc, a friction member fixed to the friction plate which presses against a pressure surface provided on the damper hub only when the clutch disc engages the first flywheel and a spring member positioned between the friction plate and the spline hub to urge the friction plate and the friction member toward the second flywheel.

2. A flywheel assembly as set forth in claim 1, in which said torsion damper mechanism includes a torsion spring in a recessed part of an outer peripheral part of said damper hub portion of said flywheel.

3. A flywheel assembly as set forth in claim 2, in which said damper inertial part includes an inner damper inertial part and a radially aligned outer damper inertial part and spring holders are provided in said recessed part of said damper hub portion and in recessed parts formed in said inner damper inertial part and said outer damper inertial part and torsion springs are compressively installed between said spring holder to resiliently interconnect said inner and outer damper inertial parts with each other and with said damper hub.

4. A flywheel as set forth in claim 2, in which said torsion damper mechanism further includes an additional torsion spring installed in recessed parts formed in an outer peripheral part and an inner peripheral part of the damper inertial part of said second flywheel.

5. A flywheel assembly as set forth in claim 1, in which said friction damping mechanism comprises said friction plate, said friction member, said pressure surface of said damper hub and said spring member, the friction member being fixed to said friction plate fitting onto an outer peripheral surface of said spline hub of said clutch disc, said spring member urging said friction plate toward the crankshaft and being provided between said friction plate and said clutch disc spline hub, said friction member being fastened to a facing-on-flywheel side part of said friction plate and slidingly contacting said pressure surface of said damper hub portion when the clutch is engaged.

* * * * *